No. 841,050. PATENTED JAN. 8, 1907.
J. L. ROBERT.
IMPLEMENT FOR DISMANTLING BUILDERS' STAGINGS.
APPLICATION FILED OCT. 4, 1906.
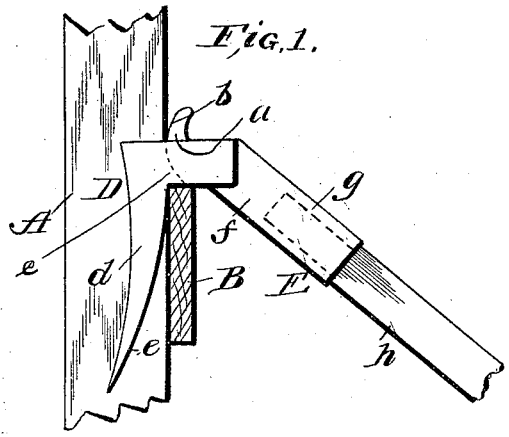
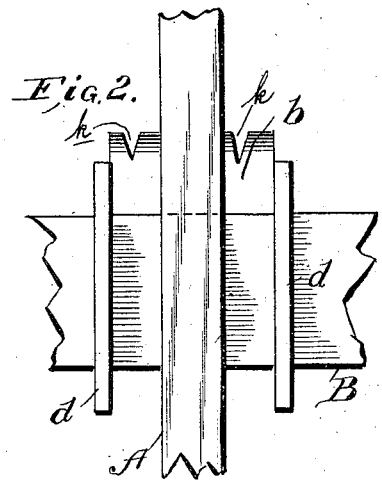
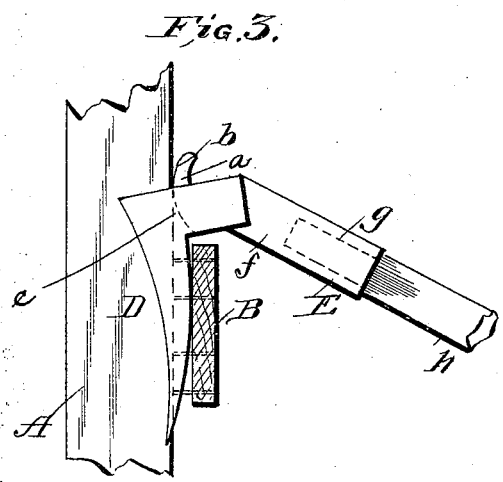
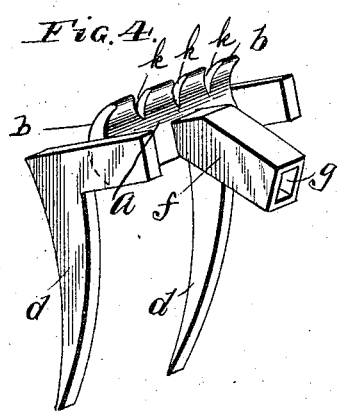
Witnesses
N. C. Healy
Thos. E. _____
Inventor
J. L. Robert.
By James J. Shuby
Attorney

UNITED STATES PATENT OFFICE.

JEAN LOUIS ROBERT, OF LONSDALE, RHODE ISLAND.

IMPLEMENT FOR DISMANTLING BUILDERS' STAGINGS.

No. 841,050.  Specification of Letters Patent.  Patented Jan. 8, 1907.

Application filed October 4, 1906. Serial No. 337,423.

*To all whom it may concern:*

Be it known that I, JEAN LOUIS ROBERT, a subject of the King of Belgium, residing at Lonsdale, in the county of Providence and State of Rhode Island, have invented new and useful Improvements in Implements for Dismantling Builders' Stagings, of which the following is a specification.

My invention pertains to woodworking-tools; and it contemplates the provision of a simple and efficient implement for dismantling builders' stagings and analogous work where it is desirable to separate the pieces of lumber without splitting or otherwise injuring the same.

With the foregoing in mind the invention will be fully understood from the following description and claim when the same are read in connection with the accompanying drawings, forming part of this specification, in which—

Figure 1 is a view illustrating my novel implement in side elevation as properly arranged relative to an upright and a ledger-board which it is desired to disconnect from the upright. Fig. 2 is a view of the same, taken at a right angle to Fig. 1. Fig. 3 is a view similar to Fig. 1, illustrative of the manner in which the implement operates to draw a ledger-board away from an upright; and Fig. 4 is a perspective view showing the implement apart from the staging.

Similar letters designate corresponding parts in all of the views of the drawings, referring to which—

A is an upright or upright stud of a builder's staging. B is a ledger-board connected to said upright through the medium of nails C in the ordinary well-known manner.

D is the head of the implement constituting the present and preferred embodiment of my invention, and E is the handle thereof.

The implement-head D is formed of one piece of steel or other material suitable to the purpose of my invention and comprises a transverse fulcrum portion $a$, the face $b$ of which is convex in the direction of its width, arms $c$, reaching forward from and at right angles to the ends of the fulcrum portion $a$, and claws $d$, extending downward from the arms $c$ and tapered to points at their lower ends and having their rear edges $e$ slightly convex in the direction of the length thereof.

The implement-handle E is arranged at about the angle illustrated to the head D and might as a whole be formed of metal and integral with the head without involving departure from the scope of my invention. I prefer, however, for the sake of lightness to have the handle E comprise a shank $f$, formed integral with the head D and provided with a socket $g$ and a comparatively long portion $h$ of wood, arranged with its forward end in said socket $g$.

The arms $c$ of the head D serve when the head is positioned, as shown, relative to a stud and ledger-board to rest on the ledger-board and in that way take the weight of the head off the handle of the implement.

In the practical use of my implement the same is arranged as shown in Fig. 1 when it is desired to employ it in disconnecting a ledger-board from an upright—that is to say, the arms $c$ of the head D are arranged on the ledger-board with the convex face $b$ of fulcrum portion $a$ presented to the upright, and the claws $d$ are arranged so that they depend from the arms $c$ at the opposite side of the ledger-board with reference to the handle E. When the implement is thus arranged relative to the upright and ledger-board and the handle E is moved upward, it will be seen that the implement will be supported by the ledger-board and the ledger-board will be pressed away from the upright by the claws $d$, Fig. 3, and after the ledger-board is disconnected from the upright the weight of the implement-head will bear the board to the ground.

In order that the implement may be utilized when desired for drawing nails and spikes, I prefer to provide the upwardly-extended part of the fulcrum portion $a$ of head D with V-shaped notches $k$. These notches are of different sizes, as shown, in order to adapt the implement for use in connection with nails of different sizes.

It will be gathered from the foregoing that my novel implement is simple and inexpensive in construction and is easy to apply and operate, also that it is well adapted to withstand the rough usage to which woodworking implements of its type are ordinarily subjected.

The construction herein shown and described constitutes the preferred embodiment of my invention; but I desire it understood that in practice such changes in the form, construction, and relative arrangement of parts may be made as fairly fall within the scope of my invention as claimed.

Having described my invention, what I claim, and desire to secure by Letters Patent, is—

In an implement for dismantling builders' stagings, a head comprising a crosswise fulcrum portion having a face which is convex in the direction of its height, arms $c$ formed integral with and reaching forward from the ends of the fulcrum portion and adapted to rest on a ledger-board, and claws formed integral with and depending from the forward portions of arms $c$ and having their rear edges convex in the direction of their length, and a handle fixed to and extending downward and outward from the fulcrum portion of the head.

In testimony whereof I have hereunto set my hand in presence of two subscribing witnesses.

JEAN LOUIS ROBERT.

Witnesses:
HENRY A. PIERCE,
GEO. W. SPAULDING.